United States Patent
Motohashi et al.

(10) Patent No.: US 9,333,550 B2
(45) Date of Patent: May 10, 2016

(54) WING PANEL AND AIRCRAFT MAIN WING

(71) Applicant: MITSUBISHI AIRCRAFT CORPORATION, Aichi (JP)

(72) Inventors: Hideto Motohashi, Aichi (JP); Yoshifumi Hosokawa, Aichi (JP); Toshinari Fujii, Aichi (JP)

(73) Assignee: MITSUBISHI AIRCRAFT CORPORATION, Aichi (JP)

( * ) Notice: Subject to any disclaimer, the term of this patent is extended or adjusted under 35 U.S.C. 154(b) by 213 days.

(21) Appl. No.: 14/160,852

(22) Filed: Jan. 22, 2014

(65) Prior Publication Data

US 2014/0190231 A1  Jul. 10, 2014

Related U.S. Application Data

(62) Division of application No. 13/399,393, filed on Feb. 17, 2012, now abandoned.

(30) Foreign Application Priority Data

Feb. 21, 2011 (JP) .................................. 2011-34417

(51) Int. Cl.
*B64C 1/00* (2006.01)
*B21D 31/06* (2006.01)
(Continued)

(52) U.S. Cl.
CPC . *B21D 31/06* (2013.01); *B64C 1/12* (2013.01); *B64C 3/182* (2013.01); *B64F 5/0009* (2013.01)

(58) Field of Classification Search
CPC ........................................................ B64C 3/26
USPC ................................... 244/123.3, 123.4, 132
See application file for complete search history.

(56) References Cited

U.S. PATENT DOCUMENTS 2,372,510 A * 3/1945 Mitchell ................... B64C 3/00
                                                    244/123.2
3,976,269 A * 8/1976 Gupta ....................... B64C 1/12
                                                    181/287

(Continued)

FOREIGN PATENT DOCUMENTS

EP          1 439 121 A1    7/2004
JP          2001-253393 A   9/2001

(Continued)

OTHER PUBLICATIONS

Japanese Office action for Application No. 2011-034417 dated Jan. 22, 2013.

(Continued)

*Primary Examiner* — Brian M O'Hara
*Assistant Examiner* — Keith L Dixon
(74) *Attorney, Agent, or Firm* — Pearne & Gordon LLP

(57) ABSTRACT

There is provided a wing panel having improved formability at the time when the wing panel is curvedly formed by the peen forming method, and an aircraft main wing provided with the said wing panel. For a stringer member 20, a base part 21 is formed, and the neutral axis position N in the cross-sectional direction is located on the wing panel 11 side from the center position C in the height direction of a web part 22. When the peen forming method is carried out by projecting metal shots to a portion near a flange part 23 in the tip end portion of the stringer member 20, the tensile strain developing in the portion near a flange part 23 acts in a state in which the moment length around the neutral axis position N is kept long.

11 Claims, 5 Drawing Sheets

(51) Int. Cl.
*B64C 1/12* (2006.01)
*B64C 3/18* (2006.01)
*B64F 5/00* (2006.01)

(56) References Cited

U.S. PATENT DOCUMENTS

| | | | | |
|---|---|---|---|---|
| 6,105,902 | A * | 8/2000 | Pettit | B23K 20/122 244/119 |
| 6,502,788 | B2 * | 1/2003 | Noda | B32B 3/18 244/119 |
| 6,786,452 | B2 * | 9/2004 | Yamashita | B64C 3/18 244/117 R |
| 6,808,143 | B2 * | 10/2004 | Munk | B23P 21/00 244/123.1 |
| 7,025,305 | B2 * | 4/2006 | Folkesson | B32B 5/18 244/117 R |
| 7,195,203 | B2 | 3/2007 | Livingstone et al. | |
| 7,494,092 | B2 | 2/2009 | Brenner et al. | |
| 7,681,835 | B2 * | 3/2010 | Simpson | B64C 3/20 244/123.14 |
| 7,721,995 | B2 * | 5/2010 | Tanner | B64C 3/182 244/132 |
| 7,874,518 | B2 * | 1/2011 | Pham | B29C 66/474 244/132 |
| 8,276,848 | B2 * | 10/2012 | Zuniga | B64C 3/18 244/123.1 |
| 2008/0099613 | A1 | 5/2008 | Ackermann et al. | |
| 2008/0283163 | A1 | 11/2008 | Bray et al. | |
| 2009/0194636 | A1 * | 8/2009 | Childs | B64C 3/182 244/123.8 |
| 2010/0148007 | A1 | 6/2010 | Manz | |
| 2010/0282904 | A1 | 11/2010 | Kismarton et al. | |

FOREIGN PATENT DOCUMENTS

| | | |
|---|---|---|
| JP | 2003-220428 A | 8/2003 |
| JP | 2004-217208 A | 8/2004 |
| JP | 2005-530032 A | 10/2005 |
| JP | 2010-507530 A | 3/2010 |
| WO | 03/085146 A1 | 10/2003 |
| WO | 2011-121340 A1 | 10/2011 |
| WO | 2012-047751 A1 | 4/2012 |

OTHER PUBLICATIONS

Canadian Office action for Application No. 2,764,634 dated Mar. 7, 2013.
Japanese Office action for Application No. 2011-034417 dated May 8, 2013.
Ramati, S., et al. "Single Piece Wing Skin Utilizatino Via Advanced Peen Forming Technologies." Presented at the International Shot Peen Conference, Warsaw, Poland (ICSP-7); Sep. 28-30, 1999; pp. 1-18; XP-002675544.
European Search Report for counterpart application EP 12 15 3801; May 9, 2012.
Yamada. T., et al. Development of Shot Peening for Wing Integral Skin for Continental Business Jets. In: Mitsubishi Heavy Industries Technical Review, vol. 39, No. 1 (2002), pp. 36-39.

* cited by examiner

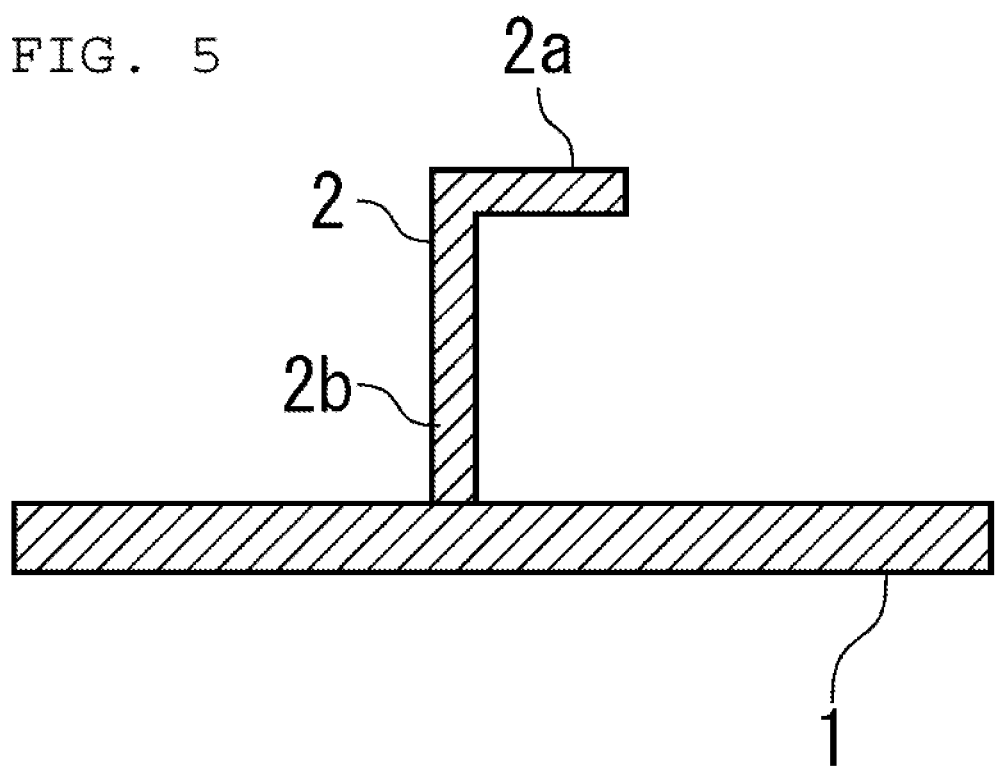

WING PANEL AND AIRCRAFT MAIN WING

This application is a divisional of U.S. patent application Ser. No. 13/399,393 filed on Feb. 17, 2012, which is based on Japanese Patent Application No. 2011-34417 filed on Feb. 21, 2011. The contents of these applications are herein incorporated by reference in their entirety.

BACKGROUND OF THE INVENTION

1. Field of the Invention

The present invention relates to a wing panel and an aircraft main wing provided with the said wing panel.

2. Description of the Related Art

An aircraft main wing is formed by attaching a wing panel forming the outer surface of the main wing to a frame member forming a skeleton. The wing panel is curvedly formed into a three-dimensional shape. Specifically, in an airframe, for example, such that an engine is attached to the lower part of the main wing, the wing panel forming the upper surface of main wing is curvedly formed so that the outer surface side of main wing is convex in the spanwise direction of the wing, and the wing panel forming the lower surface of main wing is curvedly formed so that the outer surface side of main wing is concave in the spanwise direction of the wing (convex upwardly).

To curvedly form such a wing panel, various methods including the peen forming method have been used (for example, refer to Takeshi Yamada et al. "Development of Shot Peening for Wing Integral Skin for Continental Business Jets" Mitsubishi Heavy Industries Technical Review, Vol. 39, No. 1 (2002), p. 36).

Among these methods, the peen forming method is a method in which metal shots are projected from one side of the wing panel or a member provided integrally with the wing panel to stretch the surface of a portion with which the metal shots collide, and the wing panel is curvedly formed by the difference in arc length between the one side and the other side on which the surface is not stretched.

For example, for the wing panel forming the upper surface of main wing, metal shots are projected to the side of the outer surface of main wing along a stringer. By doing this, the outer surface side of main wing is stretched in the spanwise direction of the wing. On the other hand, the inner surface side of main wing is not stretched by the collision of metal shots. As a result, the wing panel is curvedly formed so that the outer surface side of wing panel becomes convex in the spanwise direction of the wing on account of the difference in arc length between the stretched outer surface side and the not-stretched inner surface side.

As shown in FIG. 5, on a wing panel 1 forming the lower surface of main wing, a rib-shaped stringer member 2, which is continuous in the spanwise direction of main wing, is attached to the side of the inner surface of main wing. By projecting metal shots to a portion near a tip end part 2a of the stringer member 2, the stringer member 2 is formed so that the tip end part 2a side stretches with respect to a base part 2b fixed to the wing panel 1. As a result, the wing panel 1 is curvedly formed so that the inner surface side (the side on which the stringer member 2 is provided) of main wing is convex in the spanwise direction of the wing.

Unfortunately, in the case where the main wing of a small aircraft is formed by the peen forming method, the radius of curvature of main wing is small. In particular, for an airframe such that an engine is attached to the lower part of the main wing, for the wing panel forming the lower surface of main wing, to provide a clearance between the engine and the ground, the radius of curvature is small in a portion that is curvedly formed so that the wing panel is convex upward in the spanwise direction of the wing around the engine.

In such a case, there arise problems such as a problem that the wing panel 1 is not curved sufficiently by merely peen forming a portion near the tip end part 2a of the conventional stringer member 2, so that the forming work requires much time. Therefore, the improvement in formability has been demanded.

SUMMARY OF THE INVENTION

The present invention has been made to solve the above-described technical problems, and accordingly an object thereof is to provide a wing panel having improved formability at the time when the wing panel is curvedly formed by the peen forming method, and an aircraft main wing provided with the said wing panel.

To achieve the above object, the present invention provides a wing panel including a wing panel body forming the outer surface of a wing; and a rib that is formed integrally on the inner surface facing the inside of the wing and is continuous in the spanwise direction of the wing, wherein the rib is formed so that a width-expanded part, in which the thickness in the base end portion on the wing panel body side is increased, is formed, and the neutral axis position of the rib in the cross section perpendicular to the spanwise direction of the wing is located on the wing panel body side from the center in the height direction from the wing panel body of the rib.

By carrying out the peen forming method by projecting metal shots to the tip end portion of the rib, the wing panel body is curvedly formed. At this time, since the neutral axis position of the rib is located on the wing panel body side from the center in the height direction from the wing panel body of the rib, the moment caused by the strain in the tension direction developed in the tip end portion of the rib by the collision of metal shots acts greatly on the base end portion side of the rib.

The width-expanded part may have any shape. However, for example, the width-expanded part can be of a plate shape formed along the surface of the wing panel body.

In this case, the thickness of the width-expanded part in the rib rising direction can be made larger than the thickness of the rib on the tip end portion side.

Also, the rib can be configured so that the thickness thereof increases gradually from the tip end portion to the base end portion of the rib, and thereby the width-expanded part is formed on the base end portion side.

Such a rib may be formed by being machined out of a metallic base material that constitutes the wing panel body.

Also, the present invention provides an aircraft main wing wherein the outer surface of the wing is formed by the wing panel described above.

According to the present invention, by carrying out the peen forming method by projecting metal shots to the tip end portion of the rib, the wing panel body is curvedly formed. At this time, since the neutral axis position of the rib is located on the wing panel body side from the center in the height direction from the wing panel body of the rib, the moment caused by the strain in the tension direction developed in the tip end portion of the rib by the collision of metal shots acts greatly on the base end portion side of the rib. As a result, the formability at the time when the wing panel is curvedly formed can be improved.

BRIEF DESCRIPTION OF THE DRAWINGS

FIG. 5 is a sectional view of a wing panel provided with a conventional stringer member.

DETAILED DESCRIPTION OF THE PREFERRED EMBODIMENT

The present invention will now be described in detail based on an embodiment shown in the accompanying drawings.

Figure 1:
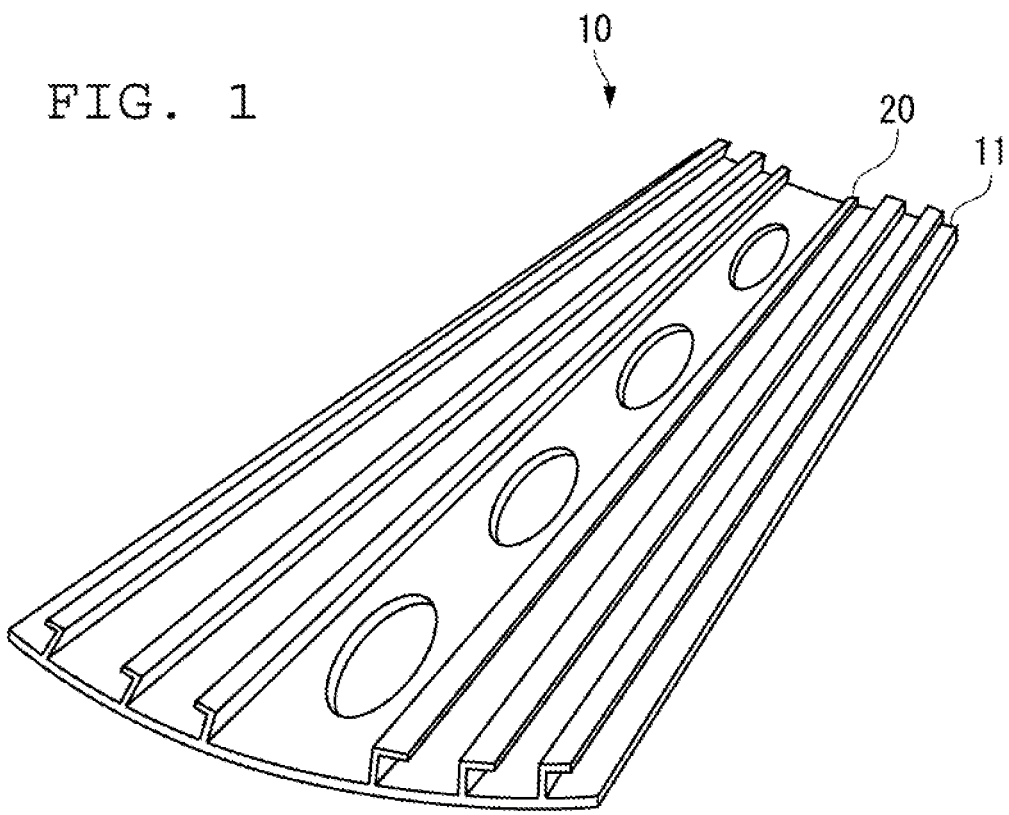
FIG. 1 is a perspective view of a wing panel forming a main wing in accordance with an embodiment of the present invention.

FIG. 1 is a perspective view of a wing panel 11 constituting the lower surface of an aircraft main wing 10 in accordance with the embodiment.

As shown in FIG. 1, the main wing 10 includes the wing panel 11 forming the wing surface and stringer members (ribs) 20 provided within the main wing 10.

In this embodiment, the lower surface side of the main wing 10 is formed by one wing panel 11. However, the configuration is not limited to this one, and two or more of wing panels 11 may be combined.

The plurality of stringer members 20 are provided in parallel with each other so as to be continuous along the spanwise direction of the main wing 10.

Figure 2:
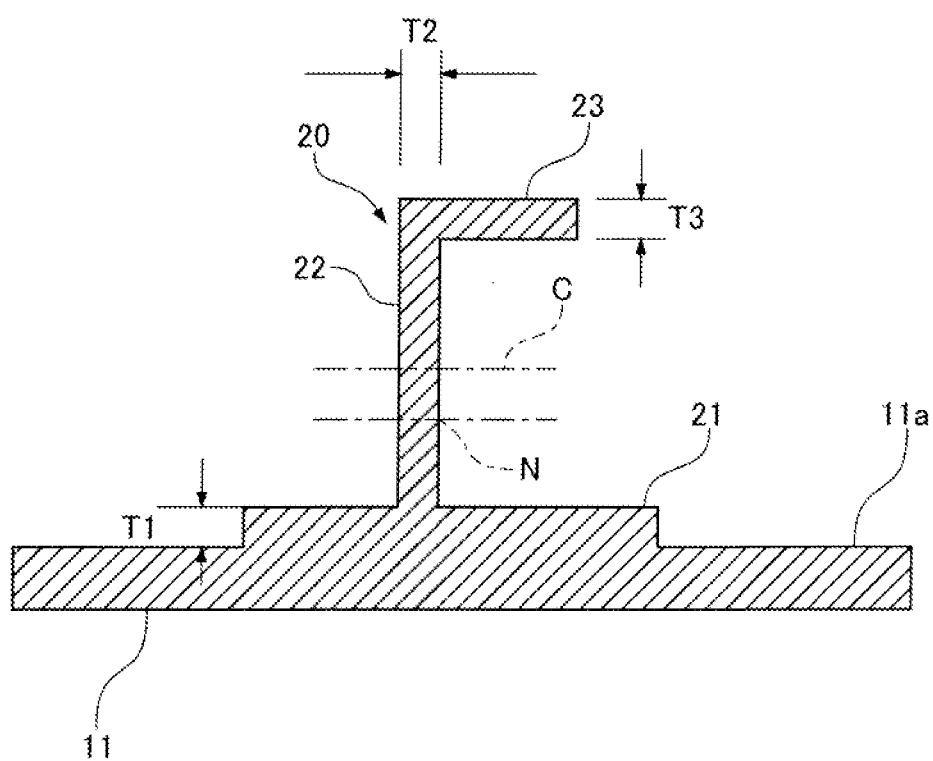
FIG. 2 is a sectional view of a stringer member provided on a wing panel.

As shown in FIG. 2, the stringer member 20 is formed into a rib shape that rises in the direction perpendicular to an inner surface 11a of the wing panel 11 and is continuous along the spanwise direction of the main wing 10.

This stringer member 20 is configured so that a plate-shaped base part 21 extending along the inner surface 11a of the wing panel 11, a web part 22 rising from the base part 21 in the direction perpendicular to the inner surface 11a of the wing panel 11, and a flange part 23 bent to the direction perpendicular to the web part 22 in the tip end portion of the web part 22 are formed integrally.

For example, for the base part 21, the web part 22, and the flange part 23, the respective plate thicknesses T1, T2 and T3 can be made equal.

For the stringer member 20 configured as described above, since the base part 21 is formed, the neutral axis position N in the cross-sectional direction is located on the wing panel 11 side from the center position C in the height direction of the web part 22.

The stringer member 20 is formed by being machined out of a metallic base material that constitutes the wing panel 11.

The wing panel 11 having the stringer members 20 configured as described above is peen-formed by projecting metal shots to a portion near the flange part 23 in the tip end portion of the web part 22 of the stringer member 20. By the collision of the metal shots, the portion near the flange part 23 is deformed in the direction such as to stretch in the direction in which the portion continues (the spanwise direction of the wing). Thereby, the wing panel 11 is curvedly deformed so that the inner surface 11a side, which is the side on which the stringer member is provided, is convex in the spanwise direction of the wing.

At this time, since the neutral axis position N of the stringer member 20 is located on the wing panel 11 side from the center position C in the height direction of the web part 22, the flange part 23 is distant from the neutral axis position N. Therefore, the compressive strain developing in the base part 21 and the wing panel 11 acts on the base part 21 and the wing panel 11 in inverse proportion to the moment length around the neutral axis position N so as to attempt to balance with the tensile strain developed in the portion near the flange part 23 by the collision of the metal shots. Therefore, the formability can be improved than before. As a result, the wing panel can be deformed efficiently even if having a small radius of curvature.

In the above-described embodiment, by forming the base part 21, the neutral axis position N of the stringer member 20 is located on the wing panel 11 side from the center position C in the height direction of the web part 22. However, the configuration is not limited to this one.

Figure 3A:
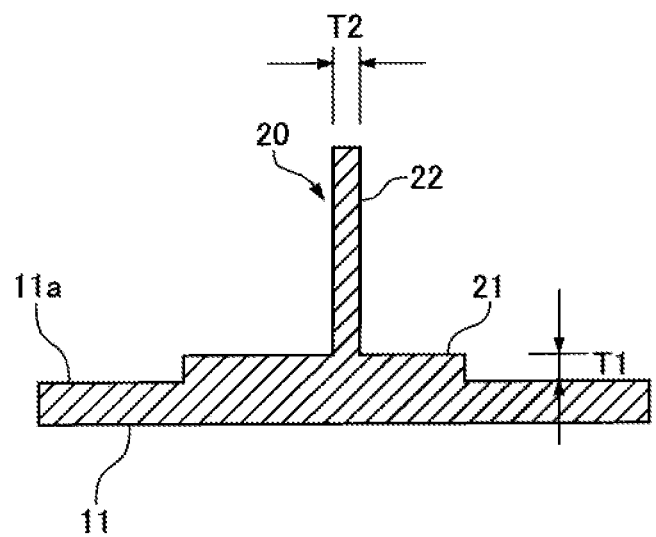
FIGS. 3A and 3B are sectional views showing other examples of a stringer member.

For example, as shown in FIG. 3A, the configuration can be made such that the flange part 23 is not formed, and the stringer member 20 consists of the web part 22 and the base part 21.

Also, the thicknesses of the web part 22 and the base part 21 may be different from each other. In this case, to locate the neutral axis position N of the stringer member 20 on the wing panel 11 side more distantly from the center position C in the height direction of the web part 22, the thickness T1 of the base part 21 may be larger than the thickness T2 of the web part 22.

Figure 3B:
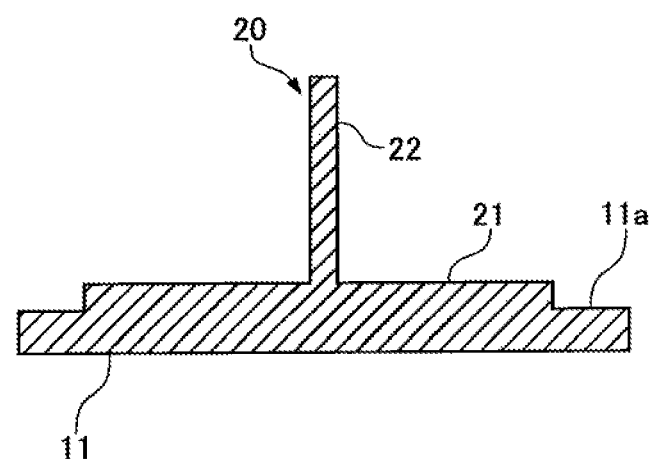

Further, to further separate the neutral axis position N of the stringer member 20 to the wing panel 11 side from the center position C in the height direction of the web part 22, the width of the base part 21 may be increased as shown in FIG. 3B.

Figure 4A:
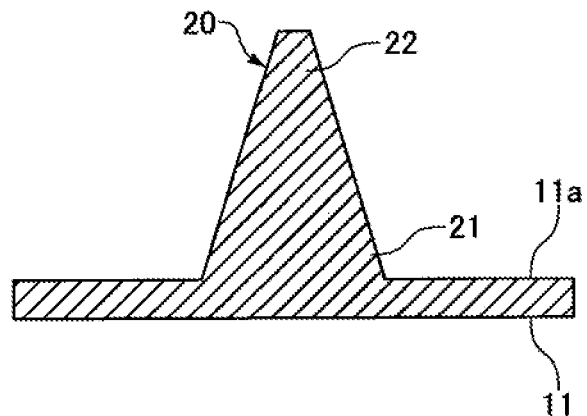
FIGS. 4A, 4B and 4C are sectional views showing still other examples of a stringer member.
Figure 4B:
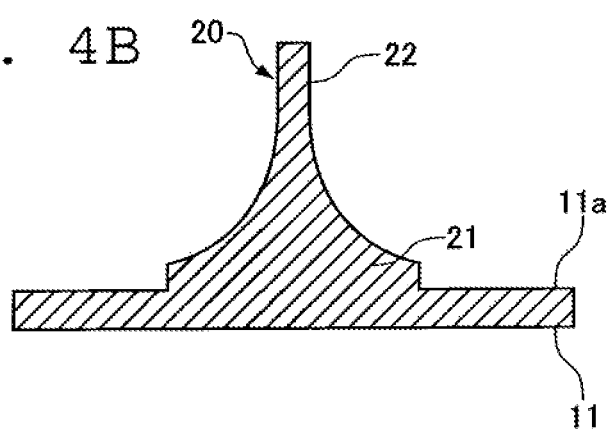
Figure 4C:
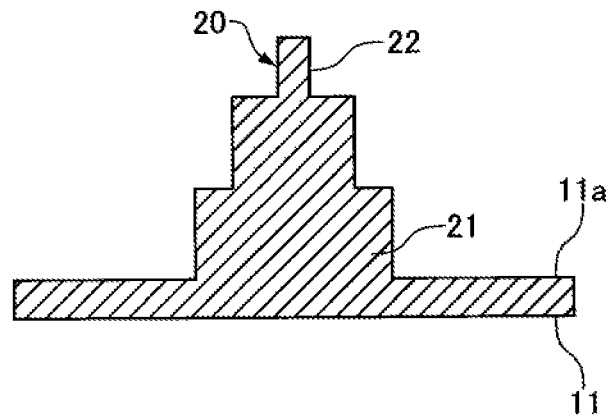

Also, as shown in FIGS. 4A to 4C, the web part 22 can have a shape such that the cross-sectional area thereof decreases gradually with increasing distance from the base part 21 side. In the example shown in FIG. 4A, the width of the web part 22 decreases gradually with increasing distance from the wing panel 11 side. The web part 22 may be displaced in a quadratic curve form as shown in FIG. 4B, or may be formed into a stairway form as shown in FIG. 4C.

Besides, the configurations described in the above-described embodiment can be selected, or can be changed to other configurations as appropriate without departing from the spirit and scope of the present invention.

What is claimed is:

1. Method for producing a wing panel having a rib, comprising:
    forming the rib such that a width-extended part extending along an inner surface of the wing panel and a web part rising from the width-expanded part in a direction perpendicular to the inner surface of the wing panel are formed integrally;
    peen-forming the wing panel by projecting metal shots to a tip end portion of the web part so as to deform the wing panel curvedly so that the inner surface is convex in a span-wise direction of the wing panel, and
    forming a neutral axis position on the rib in a cord-wise direction of the wing such that the neutral axis is located below a central axis of the rib, on the wing panel side of the rib.

2. Method for producing a wing panel having a rib according to claim 1, wherein the width-expanded part is of a plate shape.

3. Method for producing a wing panel having a rib according to claim 1, wherein the thickness of the width-expanded part in the rib rising direction is larger than the thickness of the rib on the tip end portion side.

4. Method for producing a wing panel having a rib according to claim 1, wherein the web part is formed so that the thickness thereof increases gradually from the tip end portion to a base end portion of the web part.

5. Method for producing a wing panel having a rib according to claim 1, wherein the rib is continuous along the spanwise direction of the wing panel.

6. Method for producing a wing panel having a rib according to claim 5, wherein by collision of the metal shots, the rib is deformed so as to stretch in a spanwise direction of the wing.

7. Method for producing a wing panel having a rib according to claim 1, wherein a flange part bent to the direction perpendicular to the web part in the tip end portion of the web part is formed integrally with the width-expanded part and the web part.

8. Method for producing a wing panel having a rib according to claim 1, wherein a thickness of the width-expanded part is equal to a thickness of the web part.

9. Method for producing a wing panel having a rib according to claim 1, wherein a thickness of the width-expanded part is larger than a thickness of the web part.

10. Method for producing a wing panel having a rib according to claim 1, wherein the rib is formed by being machined out of a metallic base material that constitutes the wing panel.

11. Method for producing a wing panel having a rib according to claim 1, wherein the rib is formed so that the thickness thereof increases gradually from the tip end portion to the base end portion of the rib.

* * * * *